(12) United States Patent
Zheng

(10) Patent No.: US 10,549,828 B2
(45) Date of Patent: Feb. 4, 2020

(54) FOLDABLE BREATHING MASK

(71) Applicant: Shenzhen Xingrui Industrial Co., Ltd., Shenzhen, Guangdong (CN)

(72) Inventor: Zhiming Zheng, Guangdong (CN)

(73) Assignee: Shenzhen Xingrui Industrial Co., Ltd., Shenzhen (CN)

( * ) Notice: Subject to any disclaimer, the term of this patent is extended or adjusted under 35 U.S.C. 154(b) by 0 days.

(21) Appl. No.: 16/134,955

(22) Filed: Sep. 18, 2018

(65) Prior Publication Data

US 2019/0329853 A1 Oct. 31, 2019

(51) Int. Cl.
| | | |
|---|---|---|
| *B63C 11/16* | (2006.01) | |
| *G03B 17/56* | (2006.01) | |
| *G03B 17/08* | (2006.01) | |
| *F16M 13/04* | (2006.01) | |

(52) U.S. Cl.
CPC ............. *B63C 11/16* (2013.01); *F16M 13/04* (2013.01); *G03B 17/08* (2013.01); *G03B 17/561* (2013.01)

(58) Field of Classification Search
None
See application file for complete search history.

(56) References Cited

U.S. PATENT DOCUMENTS

| | | | | |
|---|---|---|---|---|
| 2005/0237386 A1* | 10/2005 | Sandos | ................... | G03B 17/08 348/81 |
| 2008/0192114 A1* | 8/2008 | Pearson | ................. | G03B 17/08 348/81 |
| 2014/0027591 A1* | 1/2014 | Fountain | ................ | F16M 13/04 248/226.11 |
| 2018/0208281 A1* | 7/2018 | Wung | ...................... | B63C 11/12 |
| 2019/0118915 A1* | 4/2019 | Xiao | ....................... | B63C 11/16 |

* cited by examiner

*Primary Examiner* — William B Perkey

(57) ABSTRACT

The present invention discloses a foldable breathing mask, comprising: a mask body and a breathing tube, wherein the top end of the mask body extends upwardly to form a connecting tube, and one side of the connecting tube and the corresponding side of the breathing tube are respectively provided with a hinge mechanism, such that the breathing tube is turned over downwardly to be flatly attached to the mask body or turned over upwardly to be communicated with the connecting tube, the other side of the connecting tube corresponding to the hinge mechanism is provided with an elastic hook, and the breathing tube is correspondingly provided with a hook groove or a hook opening. The foldable breathing mask has the advantages of quickness in folding and convenience in assembling.

9 Claims, 5 Drawing Sheets

FOLDABLE BREATHING MASK

CROSS REFERENCE TO RELATED APPLICATIONS

The present application claims the benefit of Chinese Patent Application No. 201810381488.5 filed on Apr. 25, 2018. All the above are hereby incorporated by reference.

TECHNICAL FIELD

The present invention relates to scuba diving products, and in particular to a foldable breathing mask that can be quickly folded and is convenient to assemble.

RELATED ART

Generally, when a diver snorkels in water, in order to improve the viewing of a water scene, an eye mask and a breathing tube are prepared usually. The eye mask is fixed on the face in front of the diver's head, and then one end of the breathing tube is bitten in the diver's mouth and the other end of the breathing tube extends upwardly. The diver inhales and exhales while watching the underwater scene. The eye mask and the breathing tube of such structures are independent structures. The way of breathing with the breathing tube in the mouth will make the beginners become very unnatural, and after the snorkeling for a long time, the facial muscles will be numb, which affects the fun of the diver's experience. There is also an integral mask that does not need to be equipped with a mouthpiece type breathing tube. When in use, the mouth directly breathes by a chamber that is communicated therewith. The breathing tube of such mask is generally fixedly connected to a mask body, but such structure has a very long length, and is not convenient to carry and store.

SUMMARY

In order to overcome the defects of prior art, an objective of the present invention is to provide a foldable breathing mask that can be quickly folded and is convenient to assemble.

The present invention is implemented by the following technical measures. A foldable breathing mask comprises a mask body and a breathing tube, wherein the top end of the mask body extends upwardly to form a connecting tube, and one side of the connecting tube and the corresponding side of the breathing tube are respectively provided with a hinge mechanism, such that the breathing tube is turned over downwardly to be flatly attached to the mask body or turned over upwardly to be communicated with the connecting tube, the other side of the connecting tube corresponding to the hinge mechanism is provided with an elastic hook, the breathing tube is correspondingly provided with a hook groove or a hook opening, after the breathing tube is turned over upwardly and communicated with the connecting tube, the elastic hook can be hooked in the hook groove or the hook opening, by pressing the other end of the elastic hook, an elastic structure of the elastic hook can be deformed to be disengaged from the hook groove or the hook opening, and the breathing tube is caused to be turned over downwardly to be flatly attached to the mask body.

As a preferable manner, an inner tube opening of the connecting tube or the breathing tube extends axially to form a section of sealing tube, and the sealing tube can extend into another tube opening for sealing connection when the breathing tube is turned over and communicated with the connecting tube.

As a preferable manner, a sealing ring sleeves outside the sealing tube.

As a preferable manner, the elastic hook is a flat hook of which the middle part is hinged on a raised hinge post of the connecting tube, one end of the flat hook is provided with a hook head that can be hooked in the hook groove or the hook opening, the flat hook and the connecting tube are provided with a spring in a compressing manner, and the hinge post is also hinged with a U-shaped reinforcing frame; when the flat hook is hooked in the hook groove or the hook opening, the U-shaped reinforcing frame can be turned over to sleeve and press outside the hook groove or the hook opening, so that the flat hook cannot be disengaged from the hook groove or the hook opening; and when the U-shaped reinforcing frame is turned over from the hook groove or the hook opening, the tail of the flat hook can be moved under pressure to disengage the hook head from the hook groove or the hook opening.

As a preferable manner, the front surface of the mask body extends forwardly to form a chute, two upper edges of the chute inwardly form a clamping strip, a mounting bracket can be slidably clamped into the chute from the side, the two sides of the mounting bracket are provided with a clamping slot corresponding to the clamping strip, the bottom of the mounting bracket extends toward one end to form an elastic arm, the elastic arm extends out of the chute and is reversely clamped on the other outer end edge of the chute when the mounting bracket is clamped into a limit position of the chute, when being compressed, the elastic arm can be retracted from the outer side of the chute, and the mounting bracket is caused to slide in the chute.

As a preferable manner, two elastic arms which are in bilateral symmetry are disposed.

As a preferable manner, at least one limiting post is disposed on the bottom of the chute, and the bottom surface of the mounting bracket is provided with a limiting hole corresponding to the limiting post.

As a preferable manner, the upper surface of the mounting bracket extends upwardly in parallel to form three fixing plates, and the three fixing plates are provided with through fixing holes.

As a preferable manner, the mounting bracket is made of nylon.

As a preferable manner, a GOPRO motion camera is fixed on the mounting bracket.

The top end of the mask body according to the present invention extends upwardly to form the connecting tube, and one side of the connecting tube and the corresponding side of the breathing tube are respectively provided with the hinge mechanism, so that when not in use, the breathing tube is turned over downwardly to be flatly attached to the mask body, thereby facilitating the transportation and storage. When in need of use, the breathing tube is turned over upwardly to be communicated with the connecting tube, the elastic hook is disposed on the other side of the connecting tube, and the raised hook groove is correspondingly disposed in the breathing tube. After being turned over upwardly to be communicated with the connecting tube, the breathing tube is hooked in the hook groove or the hook opening by the elastic hook, such that the connection between the mask body and the breathing tube is firm. When the breathing tube is turned over downwardly, by pressing the other end of the elastic hook, the elastic structure of the elastic hook can be deformed to be disengaged from the hook groove or the hook opening. Therefore, the breathing tube can be freely turned over downwardly to be flatly attached to the mask body. The foldable breathing mask can be quickly folded and conveniently assembled, so that the simple assembling can be realized by the consumer while the transportation and storage are facilitated.

DETAILED DESCRIPTION

The present invention will be further described in detail below in conjunction with the embodiments and with reference to the accompanying drawings.

Figure 1:
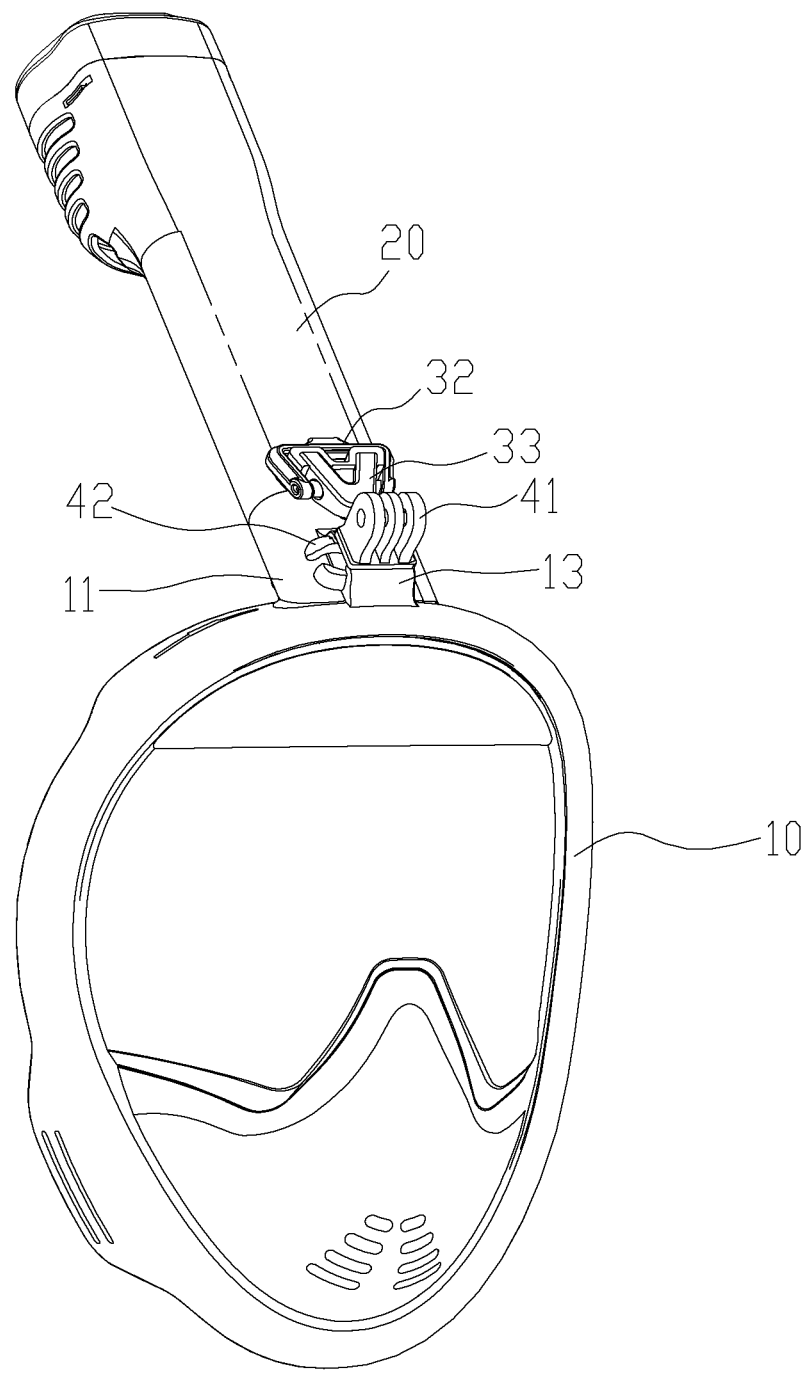
FIG. 1 is a structural schematic diagram of an embodiment provided with a mounting bracket of the present invention.
Figure 2:
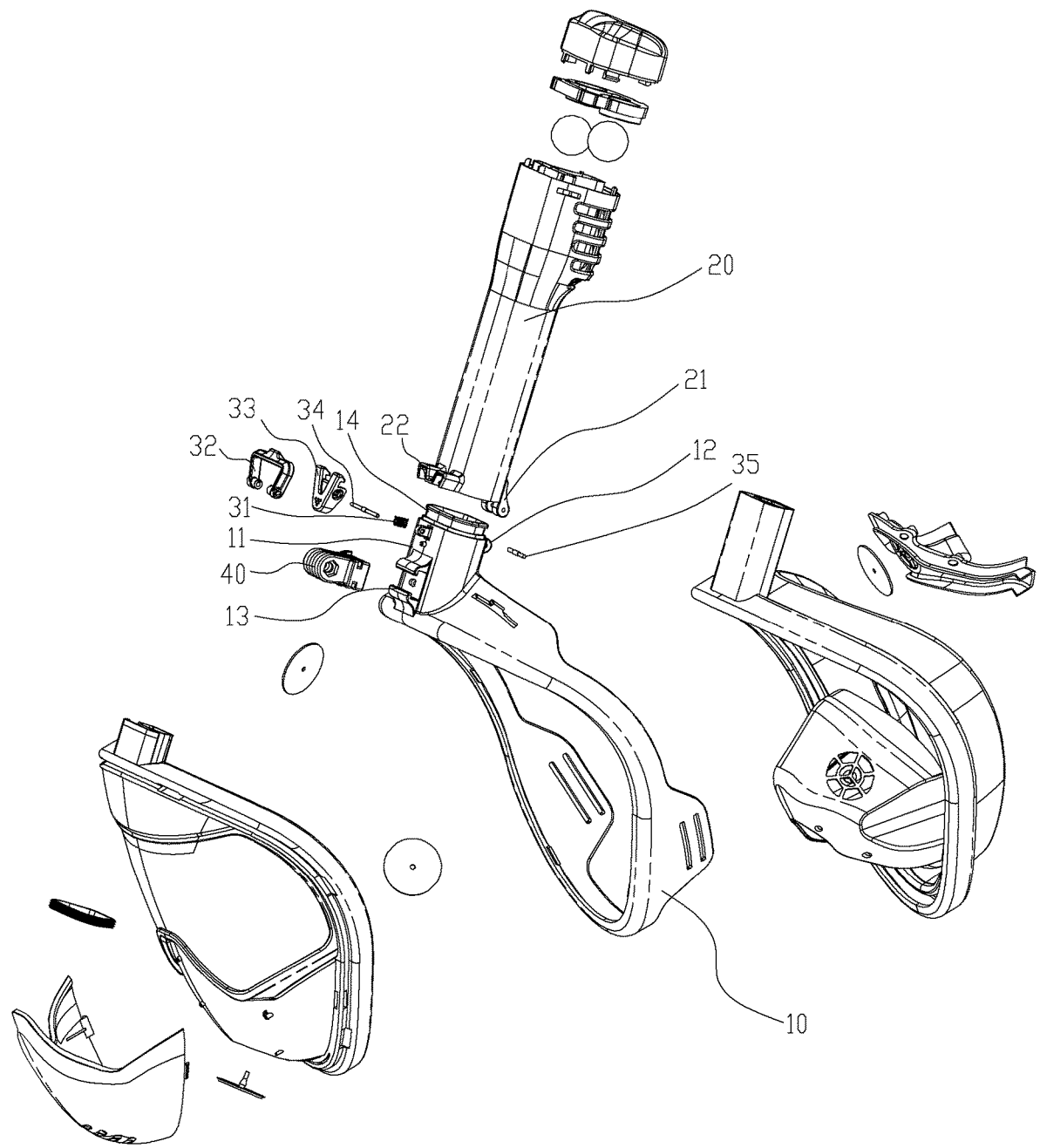
FIG. 2 is an exploded structural schematic diagram according to an embodiment of the present invention.
Figure 3:
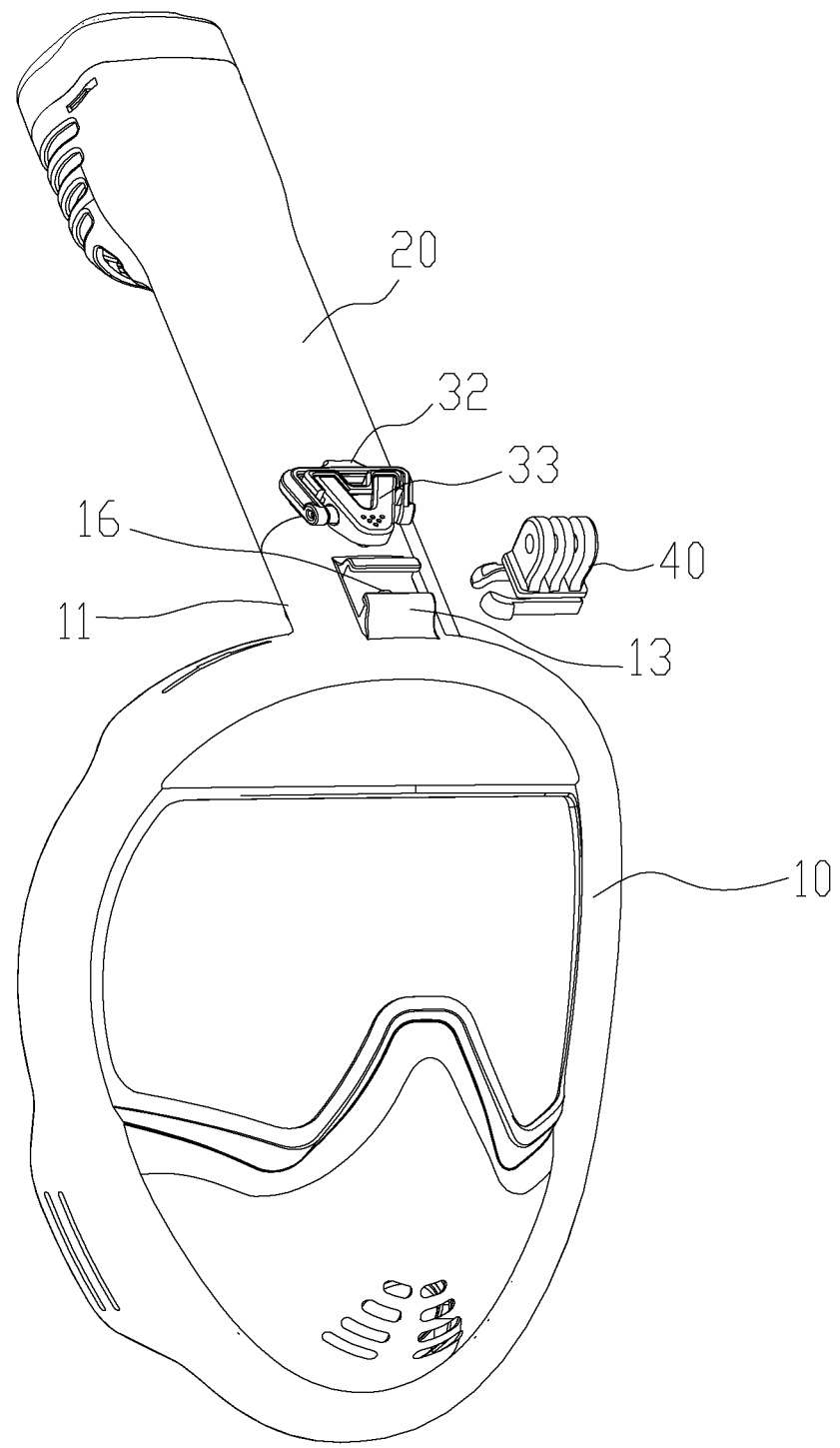
FIG. 3 is a structural schematic diagram of an embodiment without a mounting bracket of the present invention.
Figure 4:
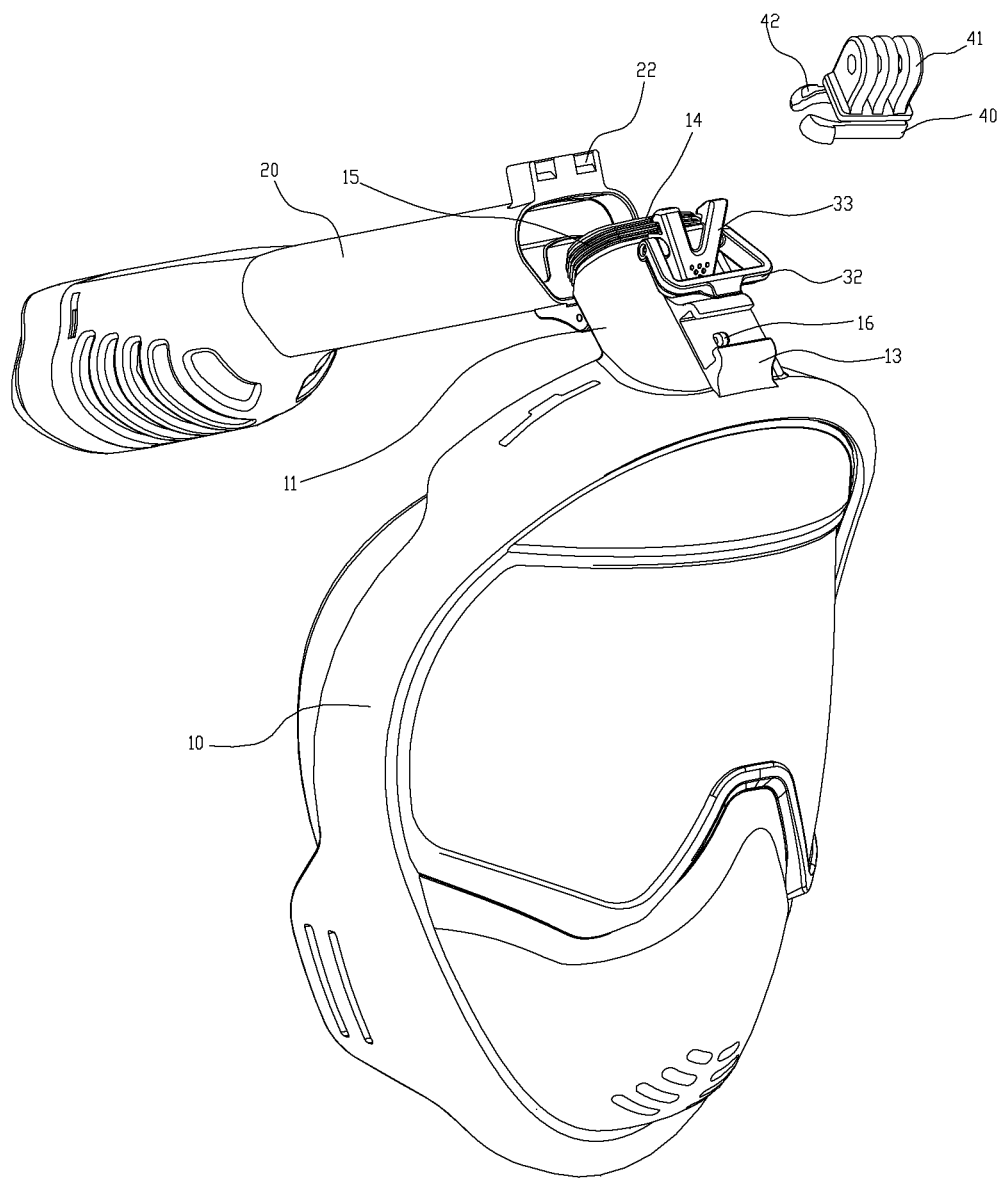
FIG. 4 is a folding structural schematic diagram according to an embodiment of the present invention.
Figure 5:
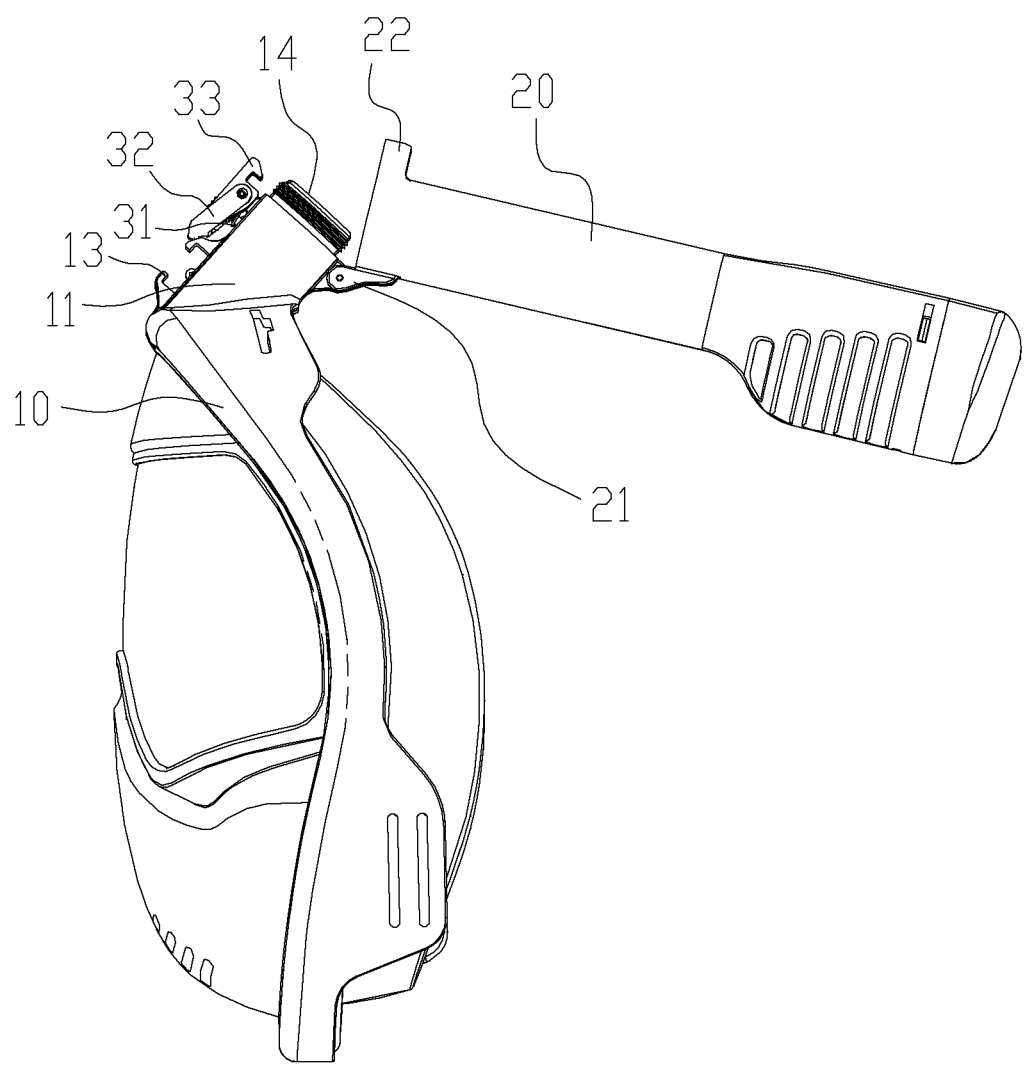
FIG. 5 is a folding side view according to an embodiment of the present invention.

A foldable breathing mask, referring to FIGS. 1 to 5, comprises a mask body 10 and a breathing tube 20. The top end of the mask body 10 extends upwardly to form a connecting tube 11, and one side of the connecting tube 11 and the corresponding side of the breathing tube are respectively provided with a hinge mechanism, so that the breathing tube is turned over downwardly to be flatly attached to the mask body or turned over upwardly to be communicated with the connecting tube, and the other side of the connecting tube corresponding to the hinge mechanism is provided with an elastic hook. The breathing tube is correspondingly provided with a hook groove or a hook opening. After the breathing tube is turned over upwardly and communicated with the connecting tube, the elastic hook can be hooked in the hook groove or the hook opening, and by pressing the other end of the elastic hook, an elastic structure of the elastic hook can be deformed to be disengaged from the hook groove or the hook opening. The breathing tube is caused to be turned over downwards to be flatly attached to the mask body.

The connecting tube 11 extends upwardly from the top end of the mask body 10 of the breathing mask. One side of the connecting tube 11 and the corresponding side of the breathing tube are convexly provided with a hinge plate 12 and a hinge clip 21 respectively, and are hinged by a first hinge shaft 35. When not in use, the breathing tube 20 can be turned over downwardly to be flatly attached to the mask body 10, thereby facilitating transportation and storage. When in need of use, the breathing tube 20 is turned over upwardly to be communicated with the connecting tube 11, and the other side of the connecting tube 11 is provided with an elastic hook 33. The breathing tube 20 is correspondingly provided with a raised hook groove 22. After being turned over upwardly to be communicated with the connecting tube 11, the breathing tube 20 is hooked into the hook groove 22 by the elastic hook 33, such that the mask body 10 and breathing tube 20 are firmly connected. When the breathing tube 20 is turned over downwardly, by pressing the other end of the elastic hook 33, a spring 31 of the elastic hook can be compressed to lift the elastic hook 33 to be disengaged from the hook groove 22. Therefore, the breathing tube 20 can be freely turned over downwardly to be flatly attached to the mask body 10. The mask can be quickly folded and conveniently assembled, so that the simple assembling can be realized by the consumer while the transportation and storage are facilitated.

In an embodiment of the foldable breathing mask, referring to FIGS. 1 to 5, based on the foregoing technical solution, specifically, it may also be that an inner tube opening of the connecting tube 11 axially extends to form a section of sealing tube 14. When the breathing tube 20 is turned over to be communicated with the connecting tube 11, the sealing tube 14 can extend into the tube opening of the breathing tube 20 for sealing connection.

In an embodiment of the foldable breathing mask, referring to FIGS. 1 to 5, in order to ensure the underwater sealability, based on the foregoing technical solution, specifically, it may also be that a sealing ring 15 sleeves outside the sealing tube 14.

In an embodiment of the foldable breathing mask, referring to FIGS. 1 to 5, based on the foregoing technical solution, specifically, it may also be that the elastic hook 33 is a flat hook of which the middle part is hinged on a raised hinge post on the connecting tube by a second hinge shaft 34, one end of the flat hook is provided with a hook head that can be hooked into the hook groove 22, and the flat hook and the connecting tube 20 are provided with a spring 31 in a compressing manner. The hinge post is also hinged with a U-shaped reinforcing frame 32. When the flat hook is hooked in the hook groove 22, the U-shaped reinforcing frame 32 can be turned over to sleeve and press outside the hook groove 22, so that the flat hook cannot be disengaged from the hook groove 22. When the U-shaped reinforcing frame 32 is turned over from the hook groove 22, the tail of the flat hook can be moved under pressure to disengage the hook head from the hook groove 22, so that the tuning over under abnormal conditions can be avoided.

In an embodiment of the foldable breathing mask, referring to FIGS. 1 to 5, based on the foregoing technical solution, specifically, it may also be that the front surface of the mask body 10 extends forwardly to form a chute 13. The two upper edges of the chute 13 inwardly form a clamping strip. A mounting bracket 40 can be slidably clamped into the chute 13 from the side. The two sides of the mounting bracket 40 are provided with a clamping groove corresponding to the clamping strip. The bottom of the mounting bracket 40 extends toward one end to form an elastic arm 42. When the mounting bracket 40 is clamped to the limit position of the chute 13, the elastic arm 42 extends out of the chute 13 and is reversely clamped on the other outer end side of the chute 13. When being compressed to the middle, the elastic arm 42 can be retracted from the outer side of the chute 13 and the mounting bracket 40 is caused to slide in the chute. The front surface of the breathing mask extends forwardly to form the chute 13, and the mounting bracket 40 for fixing the product such as a camera is disposed. The mounting bracket 40 is provided with the clamping groove and the elastic arm 42 that are matched and clamped with the chute 13. Therefore, the mounting bracket 40 on which the product such as the camera is mounted can be quickly inserted in the front of the mask body 10. When the product such as the camera is disassembled, the elastic arm 42 can be compressed toward the middle to release the clamping connection between the elastic arm 42 and the outer side of the chute 13. Therefore, the mounting bracket 40 can be quickly detached from the mask along the chute, thereby realizing quick disassembly and assembly of the product such as the camera.

In an embodiment of the foldable breathing mask, referring to FIGS. 1 to 5, based on the foregoing technical solution, specifically, it may also be that two elastic arms 42 which are in bilateral symmetry are disposed.

In an embodiment of the foldable breathing mask, referring to FIGS. 1 to 5, based on the foregoing technical solution, specifically, it may also be that the bottom of the chute 13 is provided with a limiting post 16, and the bottom surface of the mounting bracket 40 is provided with a limiting hole corresponding to the limiting post 16, so that the mounting bracket 40 can be limited and clamped in the chute 13 and is prevented from being disengaged.

In an embodiment of the foldable breathing mask, referring to FIGS. 1 to 5, based on the foregoing technical solution, specifically, it may also be that the upper surface of the mounting bracket 40 extends upwardly in parallel to form three fixing plates 41, the three fixing plates 41 are provided with through fixing holes, and a GOPRO motion camera can be fixed by using clamping grooves between the fixing plates 41.

In an embodiment of the foldable breathing mask, referring to FIGS. 1 to 5, based on the foregoing technical solution, specifically, it may also be that the mounting bracket 40 is made of nylon.

The foregoing elaborates the foldable breathing mask of the present invention to assist in understanding the present invention, but the embodiments of the present invention are not limited to the above embodiments, and any changes, modifications, substitutions, combinations and simplifications made without departing from the principles of the present invention should all be equivalent replacements and are included in the protective scope of the present invention.

What is claimed is:

1. A foldable breathing mask, characterized by comprising: a mask body and a breathing tube, wherein the top end of the mask body extends upwardly to form a connecting tube, and one side of the connecting tube and the corresponding side of the breathing tube are respectively provided with a hinge mechanism, such that the breathing tube is turned over downwardly to be flatly attached to the mask body or turned over upwardly to be communicated with the connecting tube, the other side of the connecting tube corresponding to the hinge mechanism is provided with an elastic hook, the breathing tube is correspondingly provided with a hook groove or a hook opening, after the breathing tube is turned over upwardly and communicated with the connecting tube, the elastic hook can be hooked in the hook groove or the hook opening, by pressing the other end of the elastic hook, an elastic structure of the elastic hook can be deformed to be disengaged from the hook groove or the hook opening, and the breathing tube is caused to be turned over downwardly to be flatly attached to the mask body.

2. The foldable breathing mask according to claim 1, characterized in that an inner tube opening of the connecting tube or the breathing tube extends axially to form a section of sealing tube, and the sealing tube can extend into another tube opening for sealing connection when the breathing tube is turned over and communicated with the connecting tube.

3. The foldable breathing mask according to claim 1, characterized in that a sealing ring sleeves outside the sealing tube.

4. The foldable breathing mask according to claim 1, characterized in that the elastic hook is a flat hook of which the middle part is hinged on a raised hinge post of the connecting tube, one end of the flat hook is provided with a hook head that can be hooked in the hook groove or the hook opening, the flat hook and the connecting tube are provided with a spring in a compressing manner, and the hinge post is also hinged with a U-shaped reinforcing frame; when the flat hook is hooked in the hook groove or the hook opening, the U-shaped reinforcing frame can be turned over to sleeve and press outside the hook groove or the hook opening, so that the flat hook cannot be disengaged from the hook groove or the hook opening; and when the U-shaped reinforcing frame is turned over from the hook groove or the hook opening, the tail of the flat hook can be moved under pressure to disengage the hook head from the hook groove or the hook opening.

5. The foldable breathing mask according to claim 1, characterized in that the front surface of the mask body extends forwardly to form a chute, two upper edges of the chute inwardly form a clamping strip, a mounting bracket can be slidably clamped into the chute from the side, the two sides of the mounting bracket are provided with a clamping slot corresponding to the clamping strip, the bottom of the mounting bracket extends toward one end to form an elastic arm, the elastic arm extends out of the chute and is reversely clamped on the other outer end edge of the chute when the mounting bracket is clamped into a limit position of the chute, when being compressed, the elastic arm can be retracted from the outer side of the chute, and the mounting bracket is caused to slide in the chute.

6. The foldable breathing mask according to claim 5, characterized in that two elastic arms which are in bilateral symmetry are disposed.

7. The foldable breathing mask according to claim 5, characterized in that at least one limiting post is disposed on the bottom of the chute, and the bottom surface of the mounting bracket is provided with a limiting hole corresponding to the limiting post.

8. The foldable breathing mask according to claim 5, characterized in that the upper surface of the mounting bracket extends upwardly in parallel to form three fixing plates, and the three fixing plates are provided with through fixing holes.

9. The foldable breathing mask according to claim 5, characterized in that the mounting bracket is made of nylon.

* * * * *